3,806,531
BIS-DIENE-(1,3)-IRON MONOCARBONYLS AND A
PROCESS FOR THE PRODUCTION THEREOF
Ernst Koerner von Gustorf, Jurgen Buchkremer, Zorka
Pfajfer, and Friedrich-Wilhelm Grevels, Mulheim
(Ruhr), Germany, assignors to Studiengesellschaft Kohle
mbH, Mulheim (Ruhr), Germany
No Drawing. Filed Feb. 4, 1972, Ser. No. 223,760
Claims priority, application Germany, Feb. 6, 1971,
P 21 05 627.9
Int. Cl. C07j 15/02
U.S. Cl. 260—439 R   13 Claims

ABSTRACT OF THE DISCLOSURE

Compounds of the bis - diene - (1,3) - iron monocarbonyl type are prepared in yields of as high as 90% and more by irradiating iron pentacarbonyl together with the diene in a solvent at temperatures within the range of −60° C. to +20° C. A particularly suitable radiation source is a high pressure mercury lamp. The compounds are suited as catalysts for the oligomerization of unsaturated hydrocarbon compounds.

This invention relates to bis-diene-(1,3) - iron monocarbonyls and process for the production thereof.

Compounds of the bis-diene-iron monocarbonyl type are known per se. For example, A. Carbonaro and A. Greco describe in J. Organometal. Chem. 25 (1970) 477 the formation of bis-butadiene-iron monocarbonyl by re-acting butadiene with iron trichloride in diethyl ether at −78° C. in the presence of isopropyl magnesium chloride and saturation of the reaction mixture with carbon monoxide. The yield is about 30%. When starting from iron pentacarbonyl, not more than two CO per iron atom can be thermally replaced by butadiene. In this manner, butadiene-iron tricarbonyl is produced at 140° C. with yields of about 40% (R. G. King, Organometallic Syntheses 1, 128 (1965)).

It has now been found that compounds of the bis-diene-(1,3)-iron monocarbonyl type wherein the diene may be an open-chain or cyclic aliphatic 1,3-diene can be obtained in yields of as high as 90% and more by irradiating iron pentacarbonyl together with the diene in a solvent at temperatures within the range of −60° C. to +20° C. A particularly suitable radiation source is a high pressure mercury lamp.

Examples of dienes which may be used include butadiene, isoprene, cyclohexadiene, dimethyl butadiene, and sorbic acid esters.

The synthesis may also be effected in two stages by first isolating at 20° C. the diene-iron tricarbonyl formed from iron pentacarbonyl and diene after exposure to the same radiation and irradiating this product again in the presence of diene in the lower temperature range mentioned above. Use of an irradiation apparatus with internal and external cooling has the result that the crystals formed are deposited at the outer wall of the reaction vessel due to the temperature gradient while the lamp well remains free.

The reaction must be carried out in the absence of oxygen. However, in solid crystallized state the resultant bis-diene-iron monocarbonyls are stable in the air.

The dienes themselves in mixture with saturated aliphatic hydrocarbons or aromatic hydrocarbons such as toluene are preferably used as suitable solvents.

Bis-diene-iron carbonyls are isosteric with the starting materials of nickel catalysts such as bis-cyclo-octadiene-(1,5)-nickel-(0) in the presence of which butadiene, for example, may be oligomerized. Iron becomes formally isoelectronic with nickel-(0) by coordination of a CO. Bisdiene-iron carbonyls are equally suited catalysts for the oligomerization of unsaturated hydrocarbon compounds. For example, butadiene can be dimerized catalytically to from cyclooctadiene-(1,5) in the presence of donors such as phosphines and can be trimerized to form inter alia cyclododecatriene-(1,5,9) in the absence of phosphines.

Novel compouunds such as bis - isoprene-iron monocarbonyl, bis-cyclohexadiene-iron monocarbonyl, and bis-dimethyl-butadiene-iron monocarbonyl, and bis-sorbic acid methyl ester-iron monocarbonyl can be produced in accordance with the invention. These substituted diene complexes exhibit a catalytic activity which is higher than that of the unsubstituted diene complexes because the stability of the former is inferior to that of, for example, bis-butadiene-iron monocarbonyl.

The physical characteristics of these novel compounds are shown in the following examples illustrating their production.

EXAMPLE 1

Production of butadiene-iron tricarbonyl (I) and bis-butadiene-iron monocarbonyl (II)

(a) Butadiene iron tricarbonyl (I).—49 grams (0.25 mole) of $Fe(CO)_5$ and 54 g. (1 mole) of liquid butadiene are dissolved in 150 ml. of benzene and exposed under an argon atmosphere to the radiation of a high pressure mercury burner (Philips HPK 125 W) in an immersion lamp apparatus of Solidex glass at 20° C. until 11 liters (0.5 mole) of CO have been evolved. This requires two days on an average. Butadiene which escapes from the solution is condensed on a refrigerating finger charged with solid $CO_2$/acetone. The solution is then filtered by means of a pleated filter. Benzene and residues of $Fe(CO)_5$ are removed under the vacuum of a water jet pump and the residue is distilled at $10^{-2}$ mm. Hg and 25° to 30° C. in a molecular distillation apparatus (condensation with liquid $N_2$). The distillate is dissolved in 120 ml. of pentane and cooled for about 3 hours to −78° C. The compound I is precipitated in the form of orange-yellow crystals which are separated from the mother liquor by filtration and subsequently freed from pentane residues under a water jet vacuum. Yield: 61 g. corresponding to 65% of the theoretical yield based on $FE(CO)_5$.

Elementary analysis.—Calculated for $C_4H_6Fe(CO)_3$: C, 43.33; H, 3.12; Fe, 28.78. Found: C, 43.19; H, 3.44; Fe, 28.69.

(b) Bis - butadiene - iron monocarbonyl (II).—20.8 grams (0.11 mole) of (I) and 40 g. (0.74 mole) of butadiene in 500 ml. of pentane are exposed under an argon atmosphere for 114 hours to the radiation of an immersion lamp apparatus of Solidex glass provided with a HPK 125 W lamp. During this time, 1.5 liters (0.067 mole) of gaseous CO are evolved. The Compound II is deposited at the wall of the reaction vessel in the form of orange-red crystals. The irradiated solution is drained in cold state, freed from a small amount of a brown decomposition product by filtration, concentrated and cooled to −78° C. A further crop of the complex compound is formed. The product having been crystallized already during the irradiation is dissolved out of the apparatus, filtered and recrystallized from pentane at −78° C. A total of 4.5 g. (0.023 mole) of bis-butadiene-iron monocarbonyl is obtained, which corresponds to 21% of theory based on butadiene-iron tricarbonyl charged. Melting point, 130 to 135° C. (dec.).

Elementary analysis $(C_4H_6)_2FeCO$.—Calculated: C, 56.29; H, 6.30; Fe, 29.08. Found: C, 56.20; H, 6.20; Fe, 28.99.

EXAMPLE 2

Production of cyclohexadiene-iron tricarbonyl (III) and bis-cyclohexadiene-iron monocarbonyl (IV)

(a) Cyclohexadiene iron tricarbonyl (III).—Under the same conditions as in Example 1(a), 16.2 g. (0.083 mole) of $Fe(CO)_5$ and 23.5 g. (0.293 mole) of cyclohexadiene in 170 ml. of benzene are irradiated. Within 24 hours, 3.6 liters (0.16 mole) of gaseous CO escape. After filtration of the solution, benzene, cyclohexadiene and residues of $Fe(CO)_5$ are removed under a water jet vacuum and the residue is distilled at 0.12 mm. Hg and 65° to 70° C. The distillate is dissolved in 70 ml. of pentane and the solution cooled to −78° C. The Compound III is precipitated in the form of orange-yellow crystals which are separated from the mother liquor by filtration at −78° C. and thereafter freed from residual pentane under a water jet vacuum. Yield: 7.2 g. (11.2% of the theoretical, based on $Fe(CO)_5$ charged.

(b) Bis-cyclohexadiene-iron monocarbonyl (IV).—6.4 g. (0.029 mole) of the Compound III and 7.0 g. (0.087 mole) of cyclohexadiene in 350 ml. of pentane are exposed to radiation at −50° C. as described in Example 1. Within 95 hours, 700 ml. (0.031 mole) of gaseous CO escape. Processing is effected exactly as in Example 1 (b) to give a total of 2.8 g. of the Compound IV (corresponding to 39.6% of the theory, based on Compound III charged). Melting point, 134–136° C. (in evacuated tube).

Elementary analysis $(C_6H_8)_2FeCO$.—Calculated: C, 64.00; H, 6.60. Found: C, 63.00; H, 6.25.

EXAMPLE 3

Production of isoprene-iron tricarbonyl (V) and bis-isoprene-iron monocarbonyl (VI)

(a) Isoprene-iron tricarbonyl (VI).—68 grams (1 mole) of isoprene and 10 g. (0.05 mole) of $Fe(CO)_5$ in 450 ml. of pentane are irradiated at −50° C. as described in Example 1. Within 24 hours, 3.5 liters of CO escape. Pentane and excess isoprene and $Fe(CO)_5$ are removed under a water jet vacuum and the residue is distilled at $10^{-2}$ mm. Hg and 20° C. in a molecular distillation apparatus (condensation with liquid $N_2$). This gives 8.7 g. of the Compound V (corresponding to 81.7% of the theory, based on $Fe(CO)_5$).

(b) Bis-isoprene-iron monocarbonyl (VI).—4.7 grams (0.023 mole) of the Compound V and 34 g. (0.5 mole) of isoprene in 400 ml. of pentane are irradiated for 48 hours at −50° C. as described in Example 1. During the irradiation, 770 ml. (0.034 mole) of CO escape. The solution is then evaporated under a water jet vacuum and subjected to chromatography on silica gel with pentane as the eluant. The eluate is concentrated to 10 ml. and cooled to −78° C. The Compound VI is obtained as orange needles (melting point, 99–104° C. (dec.)). Yield: 2.5 g. (corresponding to 50% of the theoretical yield, based on the Compound V charged).

EXAMPLE 4

Production of dimethyl butadiene-iron tricarbonyl (VII) and bis-dimethylbutadiene-iron monocarbonyl (VIII)

(a) Dimethyl butadiene-iron tricarbonyl (VII).—As described in Example 3, 41 g. (0.5 mole) of 2,3-dimethyl butadiene and 10 g. (0.05 mole) of $Fe(CO)_5$ dissolved in 500 ml. of pentane are irradiated. Within 8 hours, 2 liters (0.09 mole) of CO escape. The solution is evaporated under a water jet vacuum. The residue is dissolved in a small amount of pentane, freed from undissolved matter by filtration, and subjected to chromatography on silica gel with pentane as the eluant to give 3.4 g. of the Compound VII (corresponding to 29.6% of the theoretical yield, based on $Fe(CO)_5$).

(b) Bis-dimethyl - butadiene - iron monocarbonyl (VIII).—1.4 grams (0.0063 mole) of the Compound VII and 10.5 g. (0.127 mole) of dimethyl butadiene are irradiated at −35° C. as described in Example 1. Within 18 hours, 270 ml. (0.012 mole) of CO evolve. The crystals precipitated in the irradiation apparatus are dissolved by warming to room temperature and reprecipitated by cooling to −30° C. This gives 1.13 g. (VIII) corresponding to 73% of the theoretical yield, based on the Compound VII charged. Melting point, 136° C. (dec.).

Elementary analysis $(C_6H_{10})_2FeCO$.—Calculated: C, 62.90; H, 8.07; Fe, 22.59. Found: C, 62.90; H, 8.04; Fe, 22.49.

EXAMPLE 5

Production of bis-butadiene-iron monocarbonyl (II)

10 grams (0.05 mole) of $Fe(CO)_5$ and 70 g. (1.3 moles) of butadiene are dissolved in 300 ml. of pentane and the solution is exposed at −35° C. under an argon atmosphere to the radiation of a high pressure mercury lamp (Philips HPK, 125 w.) in an immersion lamp apparatus provided with internal and external cooling means. The cooling brine is first circulated through the outer cooling jacket and then through the internal cooling jacket. The temperature gradient results in deposition of the crystalline Compound II at the outer wall of the reaction vessel. Evolution of CO is terminated after 48 hours. The compound II goes into solution at room temperature and can be freed from a small amount of brown decomposition products by filtration. When cooling the filtrate again to −78° C., pure Compound II is precipitated. Yield: 9.0 g. corresponding to 92% of the theoretical yield, based on $Fe(CO)_5$ charged.

EXAMPLE 6

Production of bis-cyclohexadiene-iron monocarbonyl (IV)

2 grams (0.01 mole) of $Fe(CO)_5$ and 8 g. (0.1 mole) of cyclohexadiene in 80 ml. of pentane are irradiated for 22 hours and processed as described in Example 5. Yield: 0.9 g. corresponding to 40% of the theoretical yield, based on $Fe(CO)_5$ charged.

EXAMPLE 7

Production of bis-isoprene-iron monocarbonyl (VI)

10 grams (0.05 mole) of $Fe(CO)_5$ and 34 g. (0.5 mole) of isoprene in 500 ml. of pentane are irradiated for 18 hours as described in Example 5. Thereafter the solution is subjected to filtration and pentane, excess isoprene and $Fe(CO)_5$ are removed under a water jet vacuum and isoprene-iron tricarbonyl formed as byproduct is removed at $10^{-2}$ mm. Hg and 20° C. The residue is subjected to chromatography on silica gel with pentane as the eluant. Evaporation of the eluate to 15 ml. and cooling to −30° C. gives the Compound VI as orange needles which are separated from the mother liquor by filtration and subsequently freed from residual pentane under a water jet vacuum. Yield: 0.23 g. corresponding to 2.1% of the theoretical yield, based on $Fe(CO)_5$ charged. Melting point, 99° to 104° C. (decomposition).

Elementary analysis $(C_5H_8)_2FeCO$.—Calculated: C, 60.0; H, 7.26; Fe, 25.5. Found: C, 61.8; H, 7.26; Fe, 24.1.

EXAMPLE 8

Production of bis-methyl sorbate iron carboxyl (IX)

1.86 grams (0.1 mole) of $Fe(CO)_5$ and 25.9 g. (0.21 mole) of methyl sorbate are dissolved in 600 ml. of toluene and irradiated for 22 hours at −40° C. in the same apparatus as in Example 5. The solution is then evaporated at 40° C. and $10^{-3}$ mm. Hg. The residue is dissolved in ether and the solution subjected to chromatography on silica gel. Cooling of the eluate to −78° C. results in precipitation of a dark red-brown crystallisate which is purified by repeating recrystallization from ether. Yield: 0.76 g. corresponding to 23.5% of the theoretical yield, based on Fe(CO)₅ charged. Melting point, 170° C. (decomposition).

Elementary analysis (C₇H₁₀O₂)₂FeCO.—Calculated: C, 54.15; H, 5.99; Fe, 16.62. Found: C, 54.66; H, 6.23; Fe, 18.21.

EXAMPLE 9

Production of bis-butadiene-iron monocarbonyl at 20° C.

1.4 grams (0.01 mole) of Fe(CO)₅ and 14 g. (0.26 mole) of butadiene are dissolved in 20 ml. of pentane. The solution is irradiated at 20° C. for 26 hours in the apparatus described in Example 1(a) while passing through a stream of argon. The solution is then filtered, concentrated under a water jet vacuum, and subjected to chromatography on silica gel using pentane as the eluant. This gives 1.18 g. (0.006 mole) of bis-butadiene-iron monocarbonyl (61% of the theoretical yield based on Fe(CO)₅).

Several bis-diene-iron monocarbonyls according to the invention are listed hereafter together with specific characteristics:

Bis-cyclohexadiene-iron monocarbonyl (a) M.P.: 134 to 136° C. (in evacuated tube).
(b) IR spectrum (n-hexane): $\nu_{CO}$ 1964.5 cm.⁻¹.
(c) ¹H—NMR spectrum (C₆H₆): multiple at $\tau$5.66 (4H), 7.45 (4H), 8.05 (4H), and 8.93 (4H).
(d) UV spectrum (n-hexane): peaks at 25 and 43.5 kK. ($\epsilon$137 and 21402).
(e) Mass spectrum: 244, 216, 134, 80, 56.
(f) X-ray structural analysis: space group P2₁2₁2₁ along {001} with the cell data: $a$=17.089±0.0005, $b$=8.495±0.0004, $c$=7.545±0.0004 angstrom, Z=4 $d$ (corr.)=1.48 g./ml.

Bis-isoprene-iron monocarbonyl (a) M.P.: 99 to 104° C. (decomposition).
(b) IR spectrum (n-hexane): $\nu_{CO}$ 1980 cm.⁻¹.
(c) ¹H—NMR spectrum (C₆H₆): multiplets at $\tau$5.66 6.10 (2H), 8.32 (6H), 8.95 (4H), and 10.40 (4H).
(d) Mass spectrum: principal masses 220, 192, 124, 68.

Bis-dimethylbutadiene-iron monocarbonyl (a) M.P. 136° C. (decomposition).
(b) IR spectrum (n-hexane): $\nu_{CO}$ 1975 cm.⁻¹.
(c) ¹H—NMR spectrum (C₆D₆): singlet at $\tau$ 8.37 (12H), multiplets at $\tau$ 8.83 (4H) and 10.30 (4H).
(d) Mass spectrum: principal masses 248, 220, 138, 82.

Bis-methyl sorbate-iron monocarbonyl (a) M.P.: 170° C. (decomposition).
(b) IR spectrum (n-hexane): $\nu_{CO}$ 1984 and 1712 cm.⁻¹.
(c) Mass spectrum: principal masses 336, 308, 182, 126.

What is claimed is:

1. A process for the production of bis-diene-iron monocarbonyls wherein the diene is selected from the group consisting of open-chain and cyclic aliphatic 1,3-dienes, the diene moiety containing up to 6 carbon atoms, which process comprises irradiating iron pentacarbonyl together with said diene in a solvent at temperatures in the range between −60° and +20° C.

2. A process as defined in claim 1 wherein said diene is a member selected from the group consisting of butadiene, isoprene, cyclohexadiene, dimethylbutadiene and sorbic acid esters.

3. A process as defined in claim 1 wherein said solvent is said diene itself in mixture with a member selected from the group consisting of aliphatic and aromatic hydrocarbons.

4. A process as defined in claim 1 wherein the radiation sources is a high pressure mercury lamp.

5. Bis-cyclohexadiene-iron monocarbonyl having the following characteristics:

(a) M.P.: 134° to 136° C. as measured in evacuated tube;
(b) IR spectrum in n-hexane: $\nu_{CO}$ 1964.5 cm.⁻¹;
(c) ¹H—NMR spectrum in benzene: multiplets at $\tau$ 5.66 indicating 4 protons, 7.45 indicating 4 protons, 8.05 indicating 4 protons and 8.93 indicating 4 protons;
(d) UV spectrum in: peaks at 25 and 43.5 kK. with extinction values at $\epsilon$ 137 and 21402;
(e) Mass spectrum: 244, 216, 134, 80, 56;
(f) X-ray structural analysis: space group P2₁2₁2₁ along {001} with the cell data: $a$=17.089±0.005, $b$=8.495±0.0004, $c$=7.545±0.0004 angstrom, Z=4; $d$, calculated=1.48 g./ml.

6. Bis-dimethyl-butadiene-iron monocarbonyl having the following characteristics:

(a) M.P.: 136° C. with decomposition;
(b) IR spectrum in: $\nu_{CO}$ 1975 cm.⁻¹;
(c) ¹H—NMR spectrum in deuterium benzene: singlet at $\tau$ 8.37 indicating 12 protons, multiplets at $\tau$ 8.83 indicating 4 protons and 10.30 indicating 4 protons;
(d) Mass spectrum: principal masses 248, 220, 138, 82.

7. Bis-methyl sorbate-iron monocarbonyl having the following characteristics:

(a) M.P.: 170° C. with decomposition;
(b) IR spectrum in n-hexane: $\nu_{CO}$ 1984 and 1712 cm.⁻¹;
(c) Mass spectrum: principal masses 336, 308, 182, 126.

8. Process as claimed in claim 1 wherein said diene is butadiene.

9. Process as claimed in claim 1 wherein said diene is isoprene.

10. Process as claimed in claim 1 wherein said diene is cyclohexadiene.

11. Process as claimed in claim 1 wherein said diene is dimethylbutadiene.

12. Process as claimed in claim 1 wherein said diene is a sorbic acid ester.

13. Process as claimed in claim 1 wherein the diene is an open-chain or cyclic aliphatic 1,3-diene of up to 7 carbon atoms.

References Cited

UNITED STATES PATENTS

| | | | |
|---|---|---|---|
| 3,126,401 | 3/1964 | Ecke | 260—439 R |
| 3,224,931 | 12/1965 | Burt | 260—439 R |

OTHER REFERENCES

Koerner Von Gustorf et al., Naturforschung 26b, (January 1971) pp. 66–67.

Carbonaro et al., J. Orgmet. Chem., 25 (1970) pp. 477–481.

Koerner Von Gustorf et al., Fortschr. Chem. Forsch. 13 (1969) pp. 388–392.

PATRICK P. GARVIN, Primary Examiner

A. P. DEMERS, Assistant Examiner

U.S. Cl. X.R.

204—157.1 R, 157.1 H, 158 R, 158 HE; 252—431 R, 431 P; 260—439 CY, 666 B

UNITED STATES PATENT OFFICE
CERTIFICATE OF CORRECTION

Patent No. 3,806,531  Dated April 23, 1974

Inventor(s) Ernst Koerner von Gustorf et al

It is certified that error appears in the above-identified patent and that said Letters Patent are hereby corrected as shown below:

Col. 2, line 4

For "from"

read -- form --

Col. 2, line 46

For "FE(CO)$_5$"

read -- Fe(CO)$_5$ --

Col. 4, line 74

For " repeating"

read -- repeated --

Col. 6, claim 5(d)

after "in"

insert -- n-hexane --

Signed and sealed this 15th day of October 1974.

(SEAL)
Attest:

McCOY M. GIBSON JR.
Attesting Officer

C. MARSHALL DANN
Commissioner of Patents